United States Patent [19]
Pfitz

[11] Patent Number: 5,941,927
[45] Date of Patent: Aug. 24, 1999

[54] METHOD AND APPARATUS FOR DETERMINING THE GAS TEMPERATURE IN AN INTERNAL COMBUSTION ENGINE

[75] Inventor: Manfred Pfitz, Vaihingen, Germany

[73] Assignee: Robert Bosch GmbH, Stuttgart, Germany

[21] Appl. No.: 09/152,333

[22] Filed: Sep. 14, 1998

[30] Foreign Application Priority Data

Sep. 17, 1997 [DE] Germany .......................... 197 40 917

[51] Int. Cl.$^6$ .......................... G01K 1/14; G01M 15/00; F02D 41/18
[52] U.S. Cl. .......................... 701/102; 73/118.2; 374/144
[58] Field of Search .......................... 73/115, 116, 117.2, 73/117.3, 118.1, 118.2; 701/101, 102; 374/137, 141, 142, 143, 144

[56] References Cited

U.S. PATENT DOCUMENTS

| | | | |
|---|---|---|---|
| 4,920,789 | 5/1990 | Gomez et al. | 73/118.2 |
| 4,958,516 | 9/1990 | Stiles et al. | 73/118.2 |
| 5,398,544 | 3/1995 | Lipinski et al. | 73/118.2 |
| 5,465,617 | 11/1995 | Dudek et al. | 73/118.2 |
| 5,631,412 | 5/1997 | Tomisawa | 73/118.2 |
| 5,635,634 | 6/1997 | Reuschenbach et al. | 73/118.2 |
| 5,714,683 | 2/1998 | Maloney | 73/118.2 |
| 5,753,805 | 5/1998 | Maloney | 73/118.2 |
| 5,803,608 | 9/1998 | Randoll et al. | 374/144 |
| 5,845,627 | 12/1998 | Olin et al. | 73/118.2 |

OTHER PUBLICATIONS

Brady, James E., and Humiston, Gerard E., *General Chemistry — Principles and Structures* (3rd Ed.). New York: John Wiley & Sons, Inc., pp. 220–230, Dec. 1982.

*Primary Examiner*—George Dombroske
*Attorney, Agent, or Firm*—Kenyon & Kenyon

[57] ABSTRACT

A method and an apparatus for determining the temperature of a gas charge in a cylinder of an internal combustion engine increase the accuracy with which the temperature of the gas charge is determined. The gas charge includes a residual gas portion and a fresh gas portion. The temperature of the gas charge is determined by ascertaining the temperature of the fresh gas portion, the proportion of the fresh gas portion in the gas charge, the temperature of the residual gas portion, and the proportion of the residual gas portion in the gas charge. The temperature of the gas charge is calculated based on these ascertained quantities.

9 Claims, 2 Drawing Sheets

METHOD AND APPARATUS FOR DETERMINING THE GAS TEMPERATURE IN AN INTERNAL COMBUSTION ENGINE

FIELD OF THE INVENTION

The present invention relates to a method and an apparatus for determining the temperature of a gas charge in a cylinder of an internal combustion engine.

BACKGROUND INFORMATION

In the combustion chamber of an internal combustion engine, an air/fuel mixture is ignited to produce an engine torque. The temperature of the gas mass charged into the combustion chamber needs to be sensed as accurately as possible, since it determines, inter alia, the engine torque, the quantity of fuel to be injected, and the ignition point.

In known methods for determining the temperature of a gas charge in a cylinder of an internal combustion engine, the temperature of the gas charge is assumed to equal the temperature of the fresh gas flowing via an intake manifold into the cylinder. For this purpose, the fresh gas temperature is ascertained or measured in the region of the intake valves of the cylinder. It is disadvantageous in this context that the temperature of the gas charge ascertained by this method supplies only insufficiently accurate values. In particular, no consideration is given to the fact that the temperature of the fresh gas rises, due to various influences, upon flowing in the cylinder. Because the fresh gas temperature is ascertained in error-prone fashion, the quantity of fuel to be injected may not be optimally calculated. The engine consequently will not be operated at its optimum working point, so that on the one hand the engine output will not reach its optimum value, and on the other hand fuel consumption and pollutant emissions are increased.

SUMMARY OF THE INVENTION

An object of the present invention is therefore to make available a method and an apparatus for determining the temperature of a gas charge in a cylinder of an internal combustion engine which overcomes the disadvantages recited above. In particular, the temperature of the gas charge is to be determined with improved accuracy. The method of the present invention is moreover to be simple and economical to implement, and the apparatus economical to manufacture, operate, and maintain.

The object of the present invention is achieved, in the case of a method for determining the temperature of a gas charge in a cylinder of an internal combustion engine, by ascertaining the proportion of fresh gas in the gas charge, the temperature of the residual gas, and the proportion of residual gas in the charge. The temperature of the gas charge is calculated from the temperature of the residual gas, the proportion of residual gas, the temperature of the fresh gas, and the proportion of fresh gas. The determination of the temperature of the gas charge is considerably improved by taking into account the residual gas proportion which is present in the cylinder as the result of a combustion which took place in a previous working cycle. In particular, the determination of the temperature of the gas charge is improved by the fact that not only are the temperatures of the fresh gas and the exhaust gas taken into account, but their temperature contributions are also weighted with reference to the respective proportions of fresh gas and residual gas. Because the temperature of the gas charge is determined more accurately, the quantity of fuel to be injected can be ascertained more accurately, and the ignition point can be set more accurately. The result is improved operation of the internal combustion engine and thus higher output torque, lower fuel consumption, and lower pollutant emissions.

In a particular embodiment of the present invention, the method calls for the temperature of the fresh gas to be ascertained in the vicinity of the intake into the cylinder. The advantageous result thereof is that the temperature of the fresh gas portion, and thus the temperature contribution of the fresh gas to the gas charge, can be ascertained exactly. The ultimate result of this, in turn, is a more accurate determination of the temperature of the entire gas charge.

In a further particular embodiment of the present invention, the method calls for the temperature of the fresh gas to be ascertained by a calculation based on at least two measured variables. It is possible for this purpose, for example, to ascertain the fresh gas temperature from the measured temperatures of the engine and of the ambient environment. It is advantageous in this context that the fresh gas temperature can be ascertained very accurately by calculation from these two measured temperatures, the ultimate result being that the temperature of the entire gas charge can be determined exactly. It is moreover advantageous that the engine temperature and the ambient temperature are as a rule already ascertained for other applications in the motor vehicle. The temperature of the fresh gas can thus be ascertained, without additional measured value sensors, from the temperature values for the engine temperature and ambient temperature that are already available.

In a further particular embodiment of the present invention, the method calls for the temperature of the fresh gas to be measured in an intake manifold. Direct measurement of the fresh gas temperature in the intake manifold requires the use of a measured value sensor for ascertaining that temperature. It is advantageous in this context that the fresh gas temperature can thereby be determined very accurately, independently of other variables ascertained instrumentally. It is furthermore advantageous that because the fresh gas temperature is ascertained instrumentally, short-term and/or local fluctuations in the fresh gas temperature are sensed, thus ultimately improving the accuracy of the temperature determination for the entire gas charge.

In a further particular embodiment of the present invention, the method calls for the temperature of the residual gas to be determined via the temperature of an exhaust gas of the internal combustion engine. This has the advantage that the temperature of the exhaust gas is, as a rule, also already available in a motor vehicle or in a control system of an internal combustion engine. The value of the exhaust gas temperature can either be measured directly, or can be ascertained indirectly by calculation on the basis of further engine control data.

It is particularly advantageous in this context that no additional instrumental outlay must be necessary in order to determine the residual gas temperature, in particular that no additional measured value sensor must be made available.

In a further particular embodiment of the present invention, the method calls for the partial pressure of the fresh gas to be ascertained as the proportion of the fresh gas, the partial pressure of the residual gas in the cylinder to be ascertained as the proportion of the residual gas, and the temperature of the gas charge to be calculated in accordance with the determining equation $$T\_ges = (p\_fg \times T\_fg + p\_rg \times T\_rg)/(p\_fg + p\_rg)$$

Taking into account the partial pressures of the gas portions weighted by the respective temperatures of those gas portions, as recited above, guarantees a very accurate determination of the temperature of the entire gas charge The partial pressure values of the individual gas portions can be referred to the instantaneous temperature of those gas portions, or can be referred to a common temperature level. It is furthermore advantageous that the numerical values for the partial pressure proportions of the fresh gas and the residual gas have, as a rule, already been ascertained within the engine control system for other purposes, and are thus already available for the present calculation of the temperature of the gas charge. It is thereby possible to determine the temperature of the gas charge accurately without additional instrumental outlay.

In a further particular embodiment of the present invention, the method calls for the mass of the fresh gas in the cylinder to be ascertained as the proportion of fresh gas, the mass of the residual gas in the cylinder to be ascertained as the proportion of residual gas, and the temperature of the gas charge to be calculated in accordance with the determining equation $$T\_ges=(m\_fg \times T\_fg + m\_rg \times T\_rg)/(m\_fg + m\_rg)$$

It is advantageous in this context that by taking into account the individual gas mass proportions, the temperature of the entire gas charge can be calculated even more accurately. The temperature contribution of the individual gas masses to the entire gas charge is thus sensed exactly. It is moreover advantageous that the mass proportions of the fresh gas and the residual gas have, as a rule, already been ascertained within the engine control system for other purposes, and are thus already available for the requisite calculation of the temperature of the entire gas charge. It is thus possible to ascertain exactly the temperature of the entire gas charge without additional outlay in terms of apparatus, in particular without additional measured value sensors.

In a further particular embodiment of the present invention, the method calls for the temperature dependency of the heat capacity of the fresh gas and the exhaust gas to be taken into account in calculating the temperature of the gas charge. Taking into account the temperature-dependent heat capacity of the individual gas portions in this fashion increases the accuracy of the temperature determination even further. In this context, the heat capacity can be taken into account, in particular, with further consideration given to the gas composition in the fresh gas and in the exhaust gas and the temperature dependency of the heat capacity based on the gas composition.

The present invention also provides an apparatus for determining the temperature of a gas charge of an internal combustion engine. The apparatus according to the present invention includes a calculation device that includes an electronic circuit, a microcontroller having corresponding peripheral and memory units, or a personal computer on which a corresponding computer program is executed.

DETAILED DESCRIPTION

Figure 1:
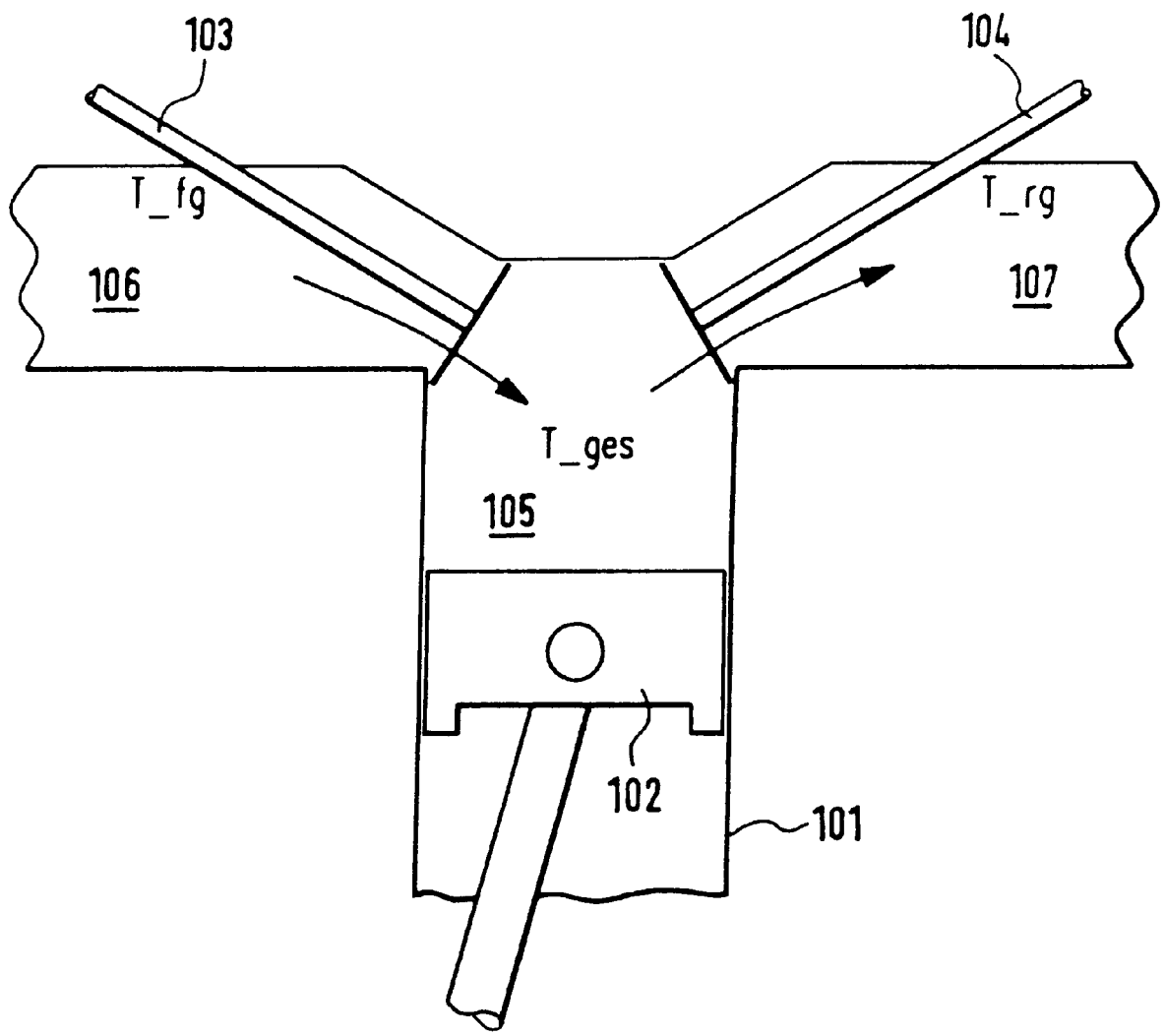
FIG. 1 shows an arrangement for supplying gas to and discharging gas from a cylinder according to the present invention.

FIG. 1 shows an arrangement for supplying gas to and discharging gas from cylinder 101. Cylinder 101 constitutes, together with piston 102, intake valve 103, and exhaust valve 104, a cylinder volume 105. Temperature T_ges of the gas quantity present in cylinder volume 105 is to be determined. With inlet valve 103 in the corresponding position, fresh gas at a temperature T_fg flows out of intake manifold 106 into cylinder volume 105. During an exhaust phase when exhaust valve 104 is in the corresponding position, exhaust gases flow out of cylinder volume 105 into exhaust manifold 107. For the present case, the exhaust gas temperature is assumed to be equal to temperature T_rg of the residual gas remaining in cylinder volume 105.

Figure 2:
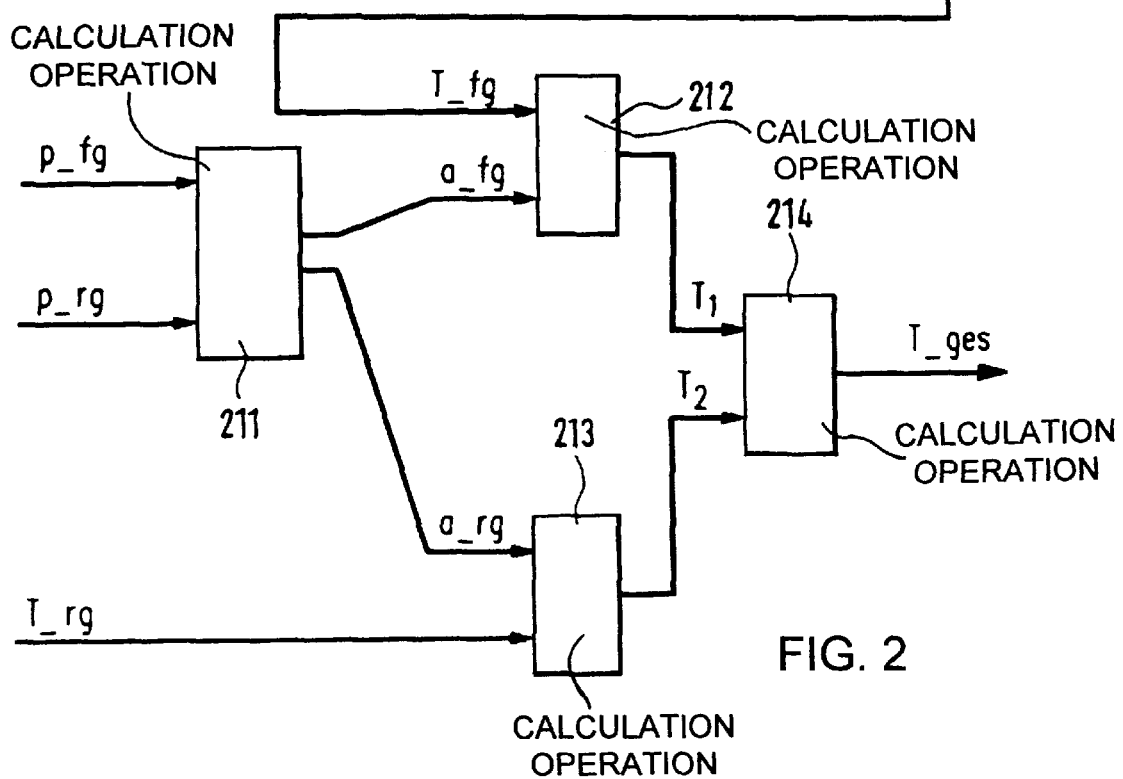
FIG. 2 shows an implementation of the method according to the present invention for determining the gas temperature.

FIG. 2 shows one implementation of the method according to the present invention for determining temperature T_ges of the entire gas charge in the cylinder. To determine this temperature T_ges, first of all temperature T_fg of the fresh gas portion is determined. For this purpose, a weighting factor 202 is first ascertained, via a function 201, from engine speed n_mot and from the pressure in intake manifold p_s. From this weighting factor that is ascertained, the effective weighting factor F_sp is ascertained via a low-pass function 203 which represents the control characteristics of the controlled gas system. This weighting factor F_sp is multiplied by motor temperature T_mot minus ambient temperature T_amb. Ambient temperature T_amb is added to the result of this multiplication, yielding a first modeled value 204 for the fresh gas temperature. Numerical value 204 emerging from this addition is converted by an operation 207 into Kelvin units. Fresh gas temperature T_fg is ascertained at the output of this temperature modeling using the input variables of engine speed n_mot, intake manifold pressure p_s, engine temperature T_mot, ambient temperature T_amb, temperature of externally recirculated exhaust gas T_egr, and proportion of externally recirculated exhaust gas a_egr. Temperature T_fg can also be ascertained in any other suitable manner; for example, the temperature can also be measured using a corresponding measured value sensor in the intake manifold.

In a second part of the method of the present invention, the proportion factors of fresh gas a_fg and exhaust gas a_rg are ascertained. These are calculated, in a first operation 211, from the partial pressure of the fresh gas p_fg and the partial pressure of the residual gas p_rg. For this, the proportion factor of the fresh gas a_fg is first calculated using the determining equation $$a\_rg=p\_rg/(p\_fg+p\_rg)$$

The proportion factor of the residual gas a_rg is calculated correspondingly using the determining equation $$a\_rg=p\_rg/(p\_fg+p\_rg)$$

The proportion factor of the fresh gas a_fg ascertained in this fashion is then multiplied by fresh gas temperature T_fg in a calculation operation 212. From this, a temperature contribution T1 of the fresh gas to temperature T_ges of the entire gas charge is ascertained. Correspondingly, the proportion factor of the residual gas a_rg is multiplied by residual gas temperature T_rg in a calculation operation 213. In this fashion, the temperature contribution T2 of the residual gas to temperature T_ges of the entire gas charge is ascertained. In a concluding calculation operation 214, the two temperature contributions T1 and T2 are added together, and the result of the temperature determination in accordance with the present invention is temperature T_ges of the entire gas charge.

What is claimed is:

1. A method for determining a temperature of a gas charge in a cylinder of an internal combustion engine, the gas charge including a residual gas portion and a fresh gas portion, the method comprising the steps of:

ascertaining a temperature of the fresh gas portion;

ascertaining a proportion of the fresh gas portion in the gas charge;

ascertaining a temperature of the residual gas portion;

ascertaining a proportion of the residual gas portion in the gas charge; and calculating the temperature of the gas charge as a function of the temperature of the residual gas portion, the proportion of the residual gas portion in the gas charge, the temperature of the fresh gas portion, and the proportion of the fresh gas portion in the gas charge.

2. The method according to claim 1, wherein the step of ascertaining the temperature of the fresh gas portion includes the step of ascertaining the temperature of the fresh gas portion in a vicinity of an intake into the cylinder.

3. The method according to claim 1, wherein the step of ascertaining the temperature of the fresh gas portion includes the step of calculating the temperature of the fresh gas portion as a function of at least two measured variables.

4. The method according to claim 1, wherein the step of ascertaining the temperature of the fresh gas portion includes the step of measuring the temperature of the fresh gas portion in an intake manifold of the internal combustion engine.

5. The method according to claim 1, wherein the step of ascertaining the temperature of the residual gas portion includes the step of determining the temperature of the residual gas portion via a temperature of an exhaust gas of the internal combustion engine.

6. The method according to claim 1, wherein:

a partial pressure of the fresh gas portion in the cylinder is ascertained as the proportion of the fresh gas portion in the gas charge, a partial pressure of the residual gas portion in the cylinder is ascertained as the proportion of the residual gas portion in the gas charge, and the temperature of the gas charge is calculated in accordance with the equation $$T\_ges=(p\_fg \times T\_fg+p\_rg \times T\_rg)/(p\_fg+p\_rg).$$

7. The method according to claim 1, wherein:

a mass of the fresh gas portion in the cylinder is ascertained as the proportion of the fresh gas portion in the gas charge, a mass of the residual gas portion in the cylinder is ascertained as the proportion of the residual gas portion in the gas charge, and the temperature of the gas charge is calculated in accordance with the equation $$T\_ges=(m\_fg \times T\_fg+m\_rg \times T\_rg)/(m\_fg+m\_rg).$$

8. The method according to claim 1, wherein the step of calculating the temperature of the gas charge includes the step of calculating the temperature of the gas charge as a function of at least a temperature dependency of a heat capacity of the fresh gas portion and a temperature dependency of a heat capacity of an exhaust gas of the internal combustion engine.

9. An apparatus for determining a temperature of a gas charge in a cylinder of an internal combustion engine, comprising:

an arrangement for ascertaining a temperature of the fresh gas portion;

an arrangement for ascertaining a proportion of the fresh gas portion in the gas charge;

an arrangement for ascertaining a temperature of the residual gas portion;

an arrangement for ascertaining a proportion of the residual gas portion in the gas charge; and a calculation device for calculating the temperature of the gas charge as a function of the temperature of the residual gas portion, the proportion of the residual gas portion in the gas charge, the temperature of the fresh gas portion, and the proportion of the fresh gas portion in the gas charge.

* * * * *